United States Patent [19]

Taketani et al.

[11] Patent Number: 4,683,651

[45] Date of Patent: Aug. 4, 1987

[54] VEHICLE ASSEMBLY LINE

[75] Inventors: Toshinobu Taketani; Ken Kuramori; Sunji Sakamoto; Hiroshi Fujii, all of Hiroshima, Japan

[73] Assignee: Mazda Motor Corporation, Japan

[21] Appl. No.: 752,558

[22] Filed: Jul. 8, 1985

[30] Foreign Application Priority Data

Jul. 9, 1984 [JP] Japan .................................. 59-142848
Jul. 9, 1984 [JP] Japan .................................. 59-142849
Jul. 9, 1984 [JP] Japan .................................. 59-142850
Jul. 9, 1984 [JP] Japan .................................. 59-142851

[51] Int. Cl.$^4$ ........................ B23P 21/00; B23P 19/00
[52] U.S. Cl. ....................................... 29/786; 29/792; 29/824
[58] Field of Search ................. 29/784, 786, 787, 791, 29/793, 794, 822–824

[56] References Cited

U.S. PATENT DOCUMENTS

| 1,750,130 | 3/1930 | Romine | 29/824 |
| 2,757,447 | 8/1956 | Barenyi | 29/794 |
| 2,779,092 | 1/1957 | Gordon | 29/794 |
| 3,968,558 | 7/1976 | Sekine | 29/783 |
| 4,033,033 | 7/1977 | Heffner | 29/824 |

FOREIGN PATENT DOCUMENTS 57-83328  5/1982  Japan .................................. 29/823

Primary Examiner—Howard N. Goldberg
Assistant Examiner—Steven Nichols
Attorney, Agent, or Firm—Gerald J. Ferguson, Jr.; Ronni S. Malamud; Michael P. Hoffman

[57] ABSTRACT

A vehicle assembly line has a main line comprising an automated assembly line portion disposed in an upstream portion thereof, a manual assembly line portion disposed in a downstream portion thereof and an automated work line portion disposed in the terminal portion thereof. The automated assembly line portion is formed of train type conveyors which can feed a vehicle body or a work selectively in continuous feed fashion or indexing feed fashion. The manual assembly line portion is formed of trolley type or power-and-free type conveyors which feed the vehicle body continuously. The automated work line portion is formed of train type conveyors which feed the vehicle body in indexing feed fashion. In the automated assembly line portion are included the assembly steps which have already been automated and those which are scheduled to be automated but are to be manually performed for the time being. At the stations for the automated steps, the train type conveyors are controlled to feed the vehicle body in indexing feed fashion while at the stations for the scheduled-to-be-automated steps, the conveyors are controlled to feed the vehicle body in continuous feed fashion. In the manual assembly line portion are disposed the assembly steps which are considered to have to depend on human labor even in future. In the automated work line portion are accomplished assembly steps which must be done after the manual assembly steps due to limitations on the assembling order.

11 Claims, 7 Drawing Figures

F I G. 1
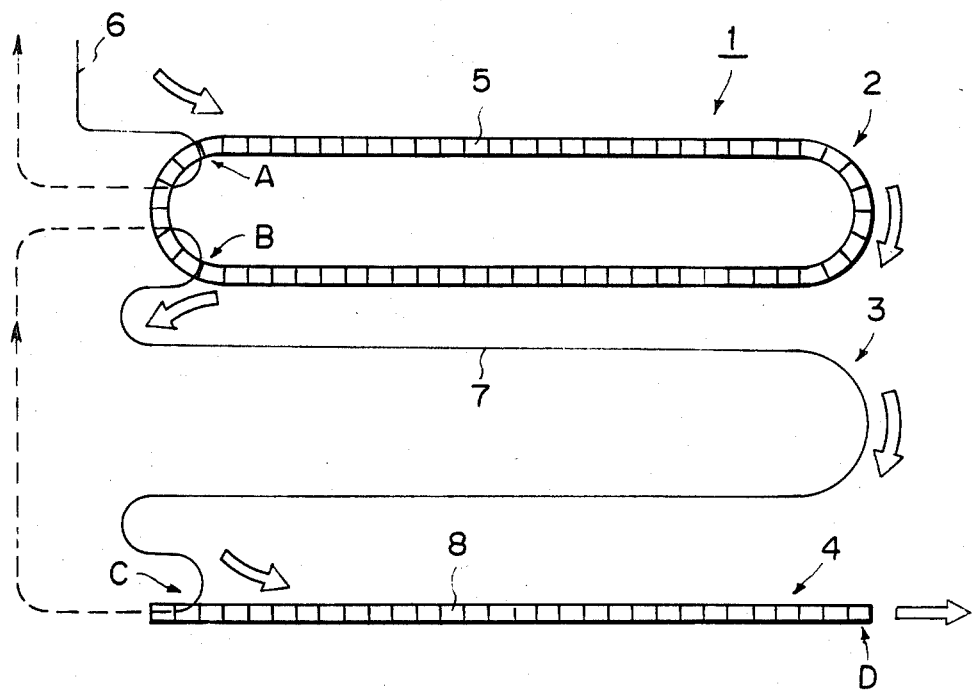

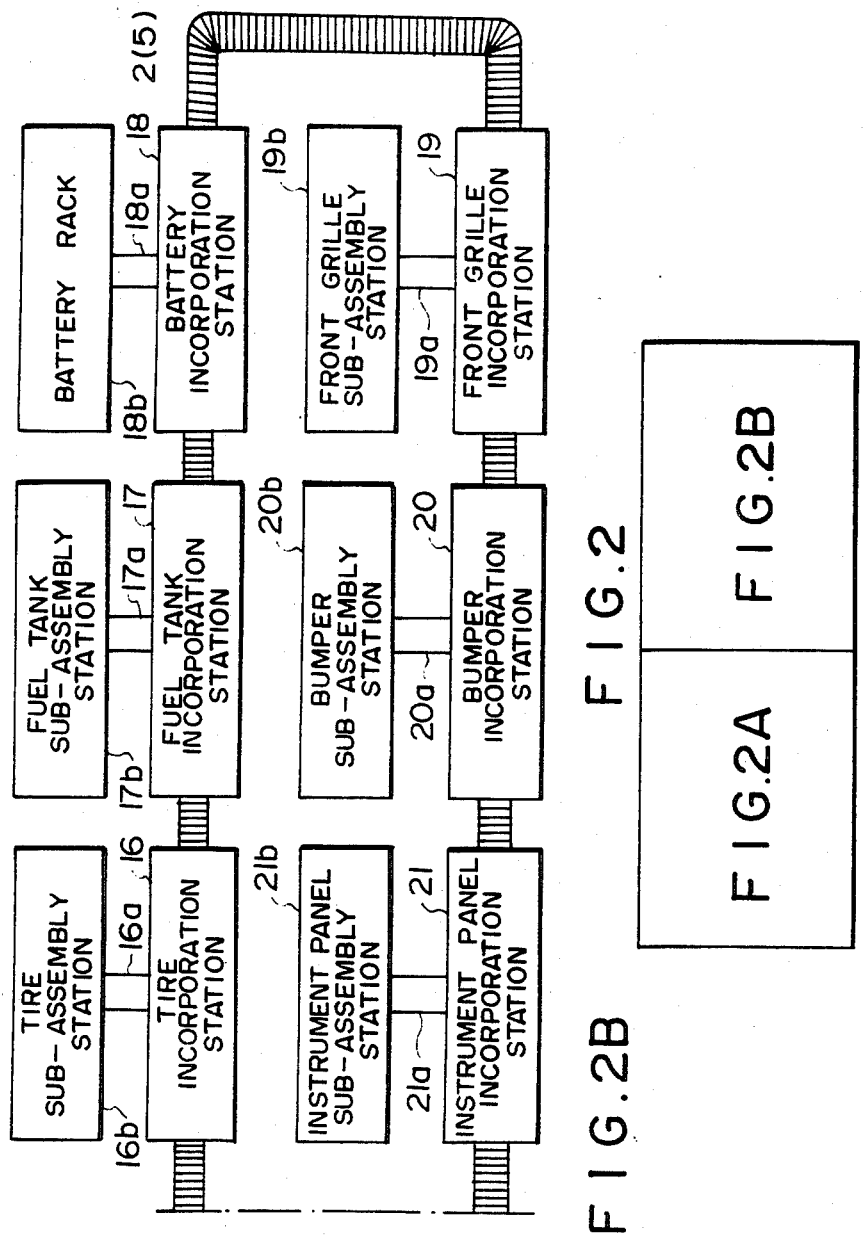

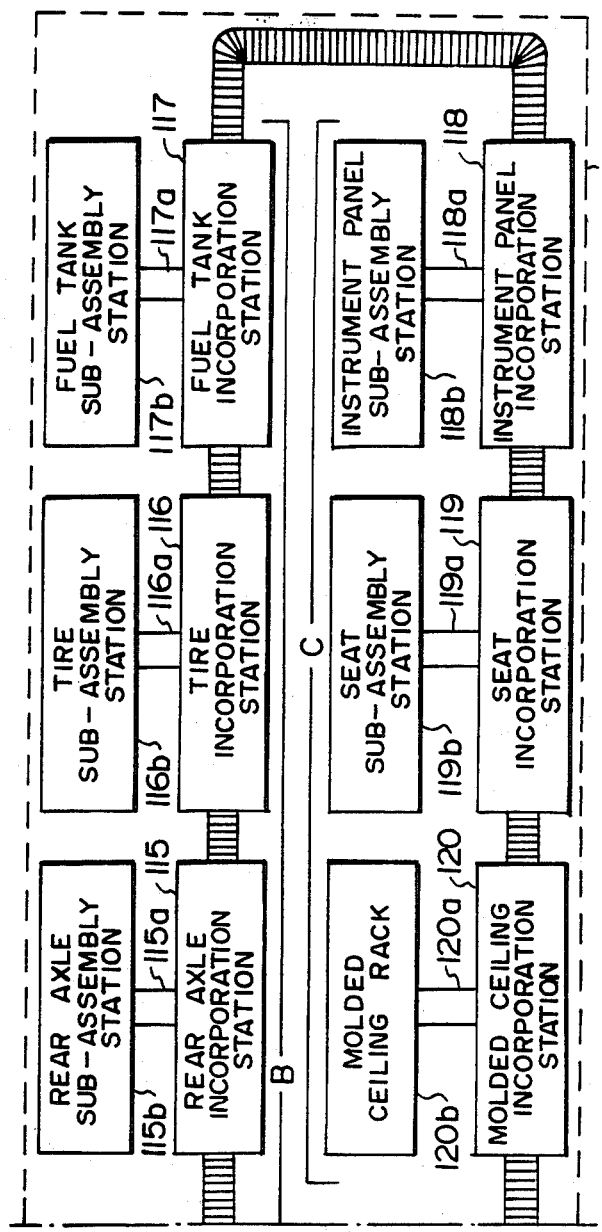
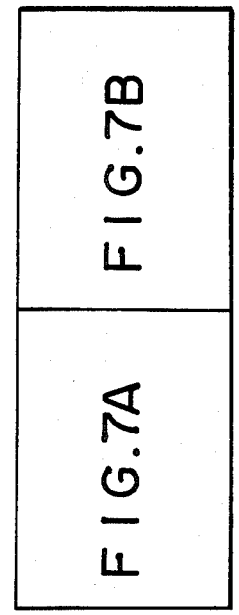
FIG. 7
FIG. 7B

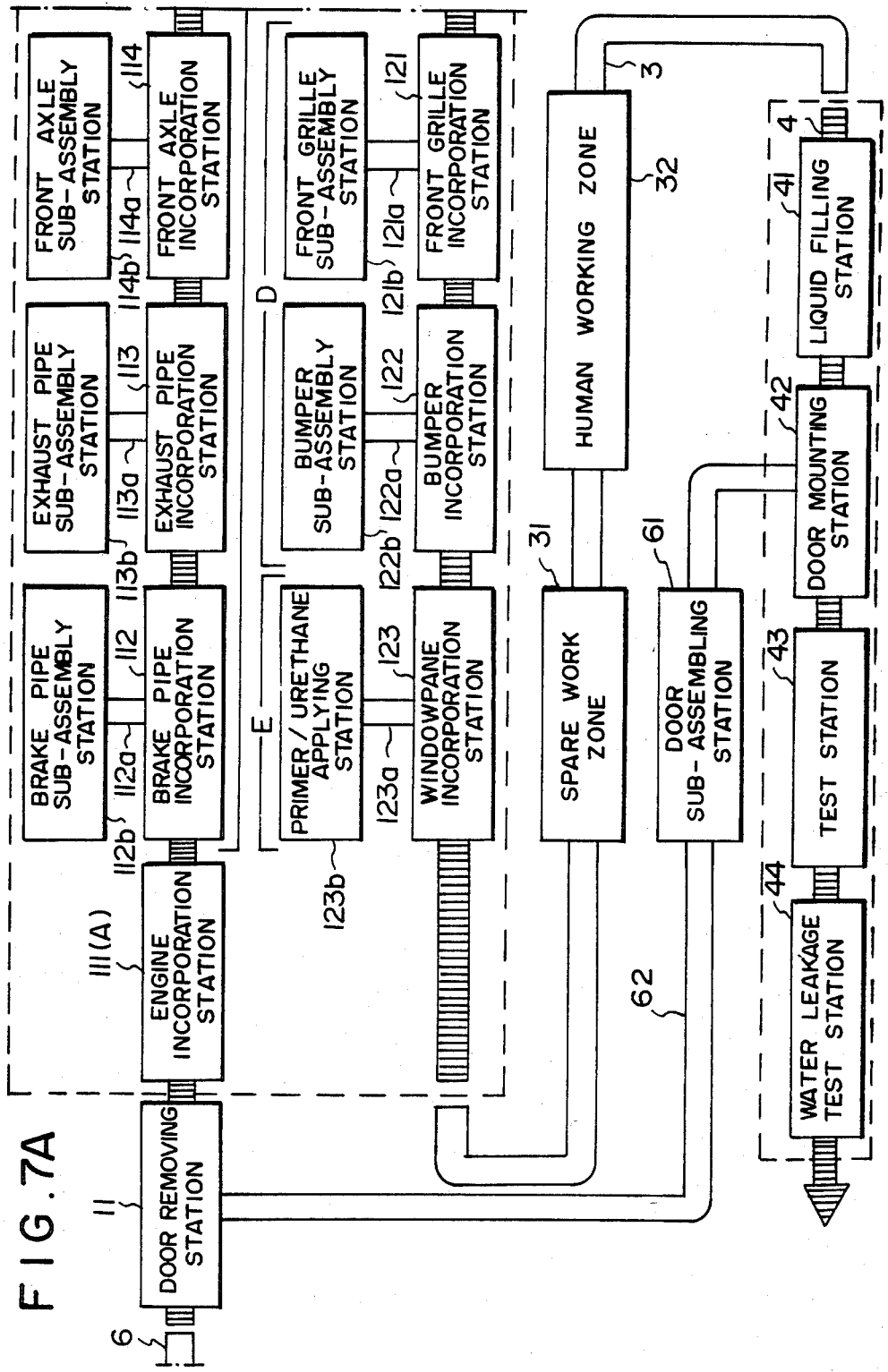

VEHICLE ASSEMBLY LINE

BACKGROUND OF THE INVENTION

1. Field of the Invention

This invention relates to a vehicle assembly line, and more particularly to a vehicle assembly line including both automated assembly steps using robots and manual assembly steps.

2. Description of the Prior Art

In the vehicle manufacturing factory, automation has been promoted using robots, for instance. However, presently, automation has been realized mainly on the welding line and the coating line and, due to the complicated operations involved, there has been little automation on the assembly line which accounts for a major part of the manufacture of vehicles. However, progress in automation techniques, such as improvement in the performance of robots, has recently enabled automation of particular the assembly line steps and will gradually make it possible to increase the number of automated steps in the assembly line.

However, in automating one or more steps in an assembly line originally designed for manual operations, there arise difficulties due to, for instance, differences in ability and intrinsic nature between robots and human beings. For example, in an assembly line depending on manual labor, the line is generally formed of continuous feed conveyors which continuously feed works at a constant speed in order to avoid the danger which arises when a work is suddenly moved during the time it is being worked on by a worker. On the other hand, in the case of an assembly line depending on machines such as robots, the relative position between the work and the machine is important and therefore continuous feed is not suitable. Further, in the case of human workers, even if the positions of the components previously incorporated into the vehicle body are somewhat displaced from the predetermined positions, this does not substantially disrupt the following steps. However, in the case of automated operation, even slight displacement of previously incorporated components can disturb the following steps. Thus, it is difficult to change steps which have been manually performed to automated steps in a point-to-point fashion. This difficulty can be avoided by changing the line arrangement when the number of steps which can be automated reaches a certain number. However, this approach is not desirable from the viewpoint of cost.

SUMMARY OF THE INVENTION

In view of the foregoing observations and description, the primary object of the present invention is to provide an assembly line in which changing of a manual step into an automated step can be easily accomplished when it becomes feasible without substantially changing the line arrangement.

Another object of the present invention is to provide an assembly line in which manual steps can be changed to automated steps one by one at low cost according to progress in automation techniques.

Still another object of the present invention is to provide an assembly line in which steps which have been automated, steps which are scheduled to be automated and steps which are considered to have to depend on human labor even in future are suitably arranged so that both human operations and automated operations can be performed most efficiently according to the intrinsic natures of human beings and the machines.

The vehicle assembly line in accordance with the present invention has a main line comprising an automated assembly line portion disposed in an upstream portion thereof, a manual assembly line portion disposed in a downstream portion thereof and an automated work line portion disposed in the terminal portion thereof. The automated assembly line portion is formed of train type conveyors which can feed a vehicle body or a work selectively in continuous feed fashion or indexing feed fashion. The manual assembly line portion is formed of trolley type or power-and-free type conveyors which feed the vehicle body continuously. The automated work line portion is formed of train type conveyors which feed the vehicle body in indexing feed fashion. In the automated assembly line portion are included the assembly steps which have already been automated and those which are scheduled to be automated but are to be manually performed for the time being. In this specification, the former steps will be referred to as "automated steps" and the latter steps will be referred to as "scheduled-to-be-automated steps", hereinbelow. At the stations for the automated steps, the train type conveyors are controlled to feed the vehicle body in indexing feed fashion, while at the stations for the scheduled-to-be-automated steps, the conveyors are controlled to feed the vehicle body in continuous feed fashion. In the manual assembly line portion are disposed steps which are considered to have to depend on human labor even in future. In the automated work line portion are accomplished steps which must be done after the manual assembly steps due to limitations on the assembling order.

In the assembly line of the present invention, the conveyors feed the vehicle body in indexing feed fashion where machines perform given operations and in continuous feed fashion where workers perform given operations. Accordingly, both human operations and automated operations can be performed most efficiently according to the intrinsic natures of human beings and the machines. Further, since the automated assembly line portion is formed of train type conveyors which can feed a vehicle body or a work selectively in continuous feed fashion or indexing feed fashion, the scheduled-to-be-automated steps can be easily changed to automated steps, when such becomes technically feasible, by simply changing the feed fashion of the conveyors to indexing feed fashion.

BRIEF DESCRIPTION OF THE DRAWINGS

FIG. 1 is a schematic view showing an arrangement of an assembly line in accordance with an embodiment of the present invention, FIG. 7 is a view similar to FIG. 2 but showing in detail the stations disposed along the assembly line in accordance with another embodiment of the present invention.

DESCRIPTION OF THE PREFERRED EMBODIMENTS

Figure 2A:
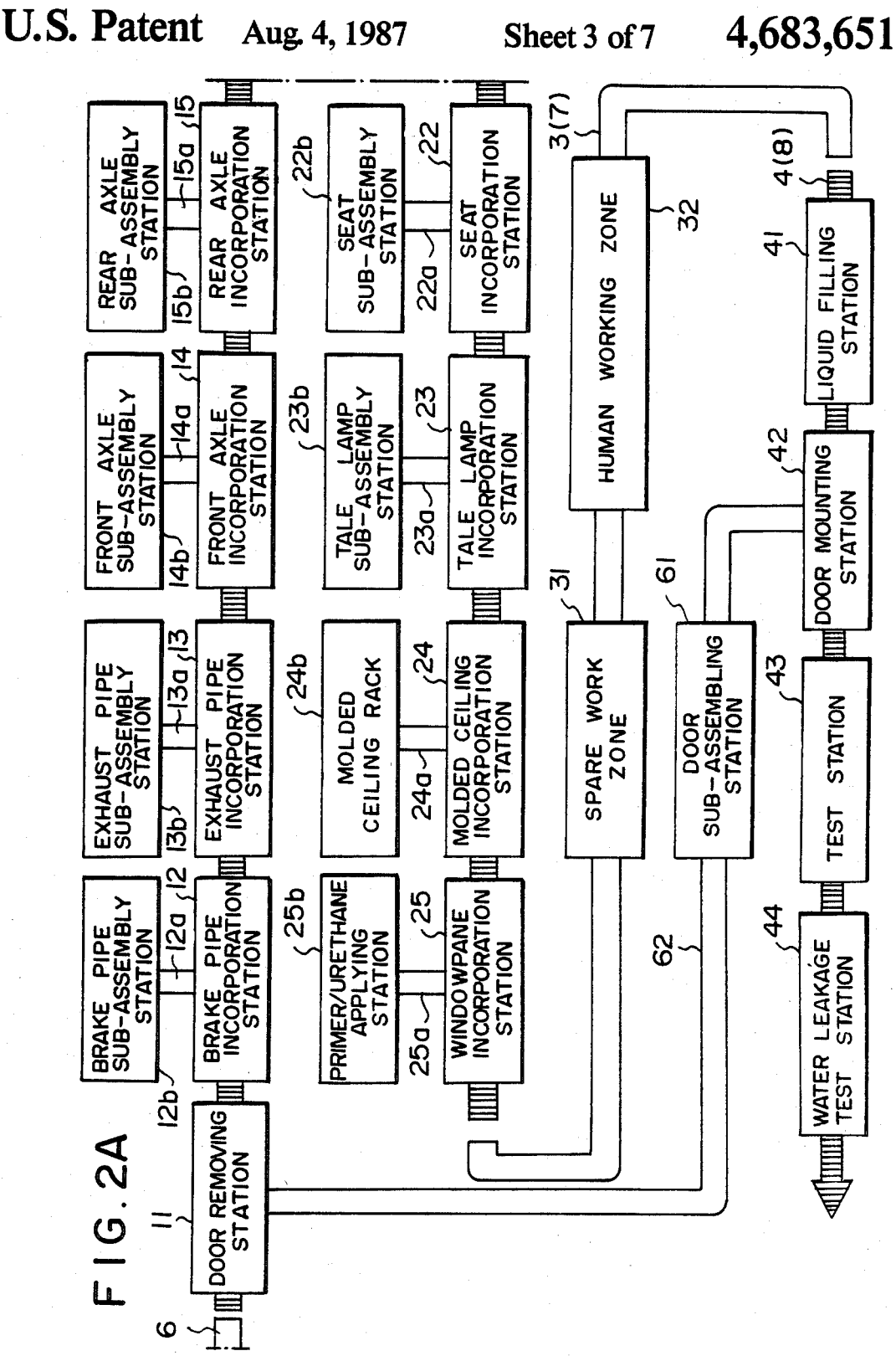
FIG. 2 is a schematic view showing in detail the stations disposed along the assembly line shown in FIG. 1.

In FIG. 1, a vehicle assembly line in accordance with an embodiment of the present invention has a main line 1 comprising an automated assembly line portion 2 disposed in an upstream portion thereof, a manual assembly line portion 3 disposed in a downstream portion thereof and an automated work line portion 4 disposed in the terminal portion thereof. The automated assembly line portion 2 is circular and is formed of train type conveyors 5 which can feed a vehicle body or a work selectively in continuous fashion or indexing feed fashion. A vehicle body delivery station A is formed at the intersection of a taking-in conveyor 6 for feeding the vehicle body from a coating line (not shown) and the automated assembly line portion 2. The manual assembly line portion 3 is also circular and is formed of trolley type or power-and-free type conveyors 7 which feed the vehicle body continuously. A relay station B from the automated assembly line portion 2 to the manual assembly line portion 3 is formed at the intersection of the paths of the train type conveyors 5 and the trolley type or power-and-free type conveyors 7. The automated work line portion 4 is formed of train type conveyors 8 which connect a relay station C at the intersection of the manual assembly line portion 3 and automated assembly line portion 2 with a line-off portion D and feeds the vehicle body in indexing feed fashion.

Along the line portions 2, 3 and 4, various stations are arranged as will be described in detail with reference to FIG. 2, hereinbelow.

At the upstream end of the automated assembly line portion 2 at which the vehicle body is delivered to the automated assembly line portion 2 from the taking-in conveyor 6, is formed a door removing station 11 at which the doors coated together with the vehicle body are removed from the vehicle body by an automated step. The vehicle body removed with the doors is successively transferred, by the train type conveyors 5, to a brake line incorporation station 12, an exhaust pipe incorporation station 13, a front axle incorporation station 14, a rear axle incorporation station 15, a tire incorporation station 16, a fuel tank incorporation station 17, a battery incorporation station 18, a front grille incorporation station 19, a bumper incorporation station 20, an instrument panel incorporation station 21, a seat incorporation station 22, a tail lamp incorporation station 23, a molded ceiling incorporation station 24 and a windowpane incorporation station 25 in this order. The incorporation stations 12 to 25 are fed with assemblies or components to be incorporated into the vehicle body at the respective incorporation stations by way of sub-lines 12a to 25a. That is, the brake line incorporation station 12 is fed with a brake line assembly from a brake line sub-assembly station 12b, the exhaust pipe incorporation station 13 is fed with an exhaust pipe assembly from an exhaust pipe sub-assembly station 13b, the front axle incorporation station 14 is fed with a front axle assembly including an engine, a steering assembly, a front suspension and the like from a front axle sub-assembly station 14b, the rear axle incorporation station 15 is fed with a rear axle assembly including a rear suspension from a rear axle sub-assembly station 15b, the tire incorporation station 16 is fed with a tire assembly including a spare tire from a tire sub-assembly station 16b, the fuel tank incorporation station 17 is fed with a fuel tank assembly from a fuel tank sub-assembly station 17b, the battery incorporation station 18 is fed with a battery from a battery rack 18b, the front grille incorporation station 19 is fed with a front grille assembly from a front grille sub-assembly station 19b, the bumper incorporation station 20 is fed with a bumper assembly from a bumper sub-assembly station 20b, the instrument panel incorporation station 21 is fed with an instrument panel assembly from an instrument panel sub-assembly station 21b, the seat incorporation station 22 is fed with a seat assembly from a seat sub-assembly station 22b, the tail lamp incorporation station 23 is fed with a tail lamp assembly from a tail lamp sub-assembly station 23b, the molded ceiling incorporation station 24 is fed with a molded ceiling member from a molded ceiling rack 24b, and the windowpane incorporation station 25 is fed with windowpanes applied with primer and urethane coatings from a primer/urethane applying station 25b.

The steps to be performed at the respective incorporation stations includes the automated steps, i.e., those which have already been automated and the scheduled-to-be-automated steps, i.e., those which are scheduled to be automated. Automatic machines such as robots are disposed at the incorporation stations for the automated steps while workers are deployed at the incorporation stations for the scheduled-to-be-automated steps to manually perform the scheduled-to-be-automated steps for the time being. The train type conveyors 5 for transferring the vehicle body to the respective incorporation stations 12 to 25 feed the vehicle body in indexing feed fashion at the incorporation stations for the automated stations and in continuous feed fashion at the incorporation stations for the scheduled-to-be-automated steps.

Figure 3:
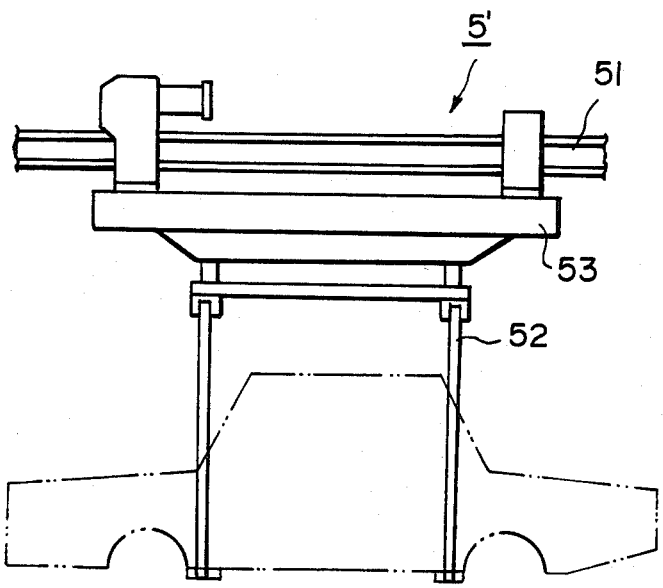
FIG. 3 is a schematic side view of an overhead train type conveyor which can be employed in the assembly line of the present invention.
Figure 4:
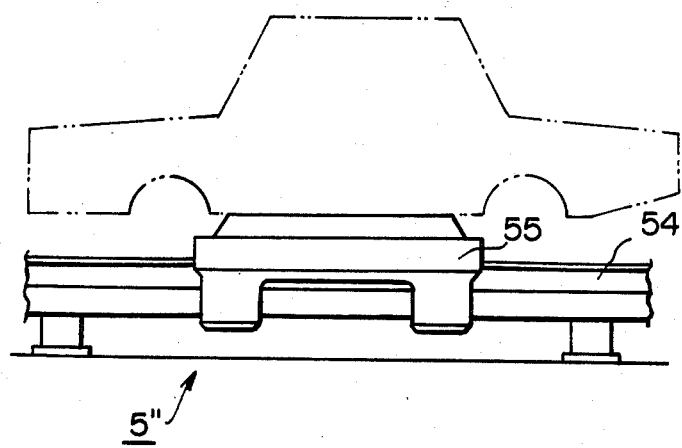
FIG. 4 is a schematic side view of a floor train type conveyor which can be employed in the assembly line of the present invention.

As the train type conveyor 5 may be used the overhead train type conveyor 5' shown in FIG. 3 or the floor train type conveyor 5" shown in FIG. 4. As shown in FIG. 3, the overhead train type conveyor 5' comprises a carrier 53 hung from a rail 51 to be movable therealong and a hanger 52 hung from the carrier 53. As shown in FIG. 4, the floor train type conveyor 5" comprises a carriage 55 placed on a rail 54 to be movable thereon. The carrier 53 and the carriage 55 are separately provided with driving mechanisms and control devices, and can be moved either in indexing feed fashion in which the carrier 53 and the carriage 55 are intermittently transferred by a predetermined distance at regular intervals, or in continuous fashion in which the carrier 53 and the carriage 55 are continuously transferred. The steps to be performed at the incorporation stations 12 to 17 are for incorporating components to be disposed on the underside of the vehicle body. Therefore, it is preferred that the vehicle body be transferred along the incorporation stations 12 to 17 by the overhead train type conveyors 5', as will be described in detail later. On the other hand, the steps to be performed at the incorporation stations 18 to 25 are for incorporating interior trims and exterior trims. Therefore, it is preferred that the vehicle body be transferred along the incorporation stations 18 to 25 by the floor train type conveyors 5", also as will be described in detail later.

Figure 5:
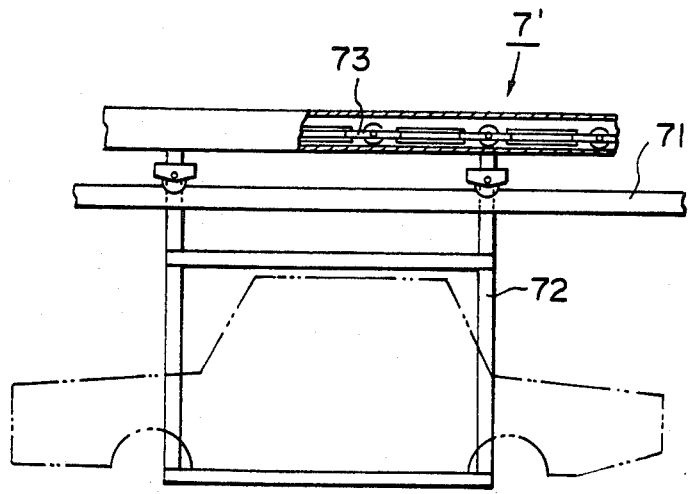
FIG. 5 is a schematic side view of a trolley type conveyor which can be employed in the assembly line of the present invention.
Figure 6:
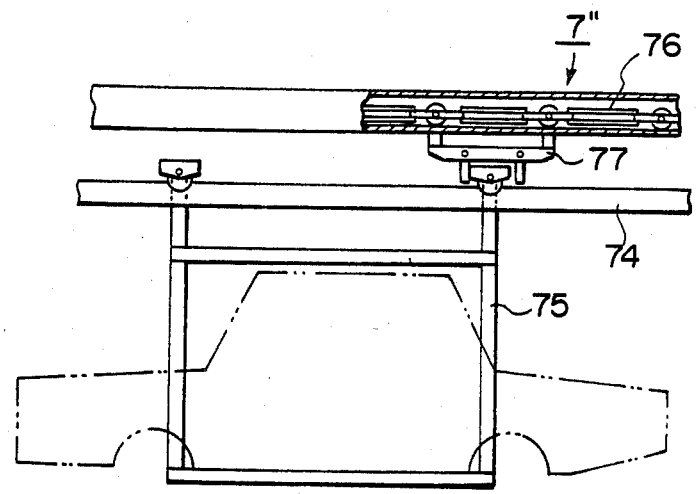
FIG. 6 is a schematic side view of a power-and-free type conveyor which can be employed in the assembly line of the present invention.

The manual assembly line portion 3 is disposed downstream of the automated assembly line portion 2. In the upstream end portion of the manual assembly line portion 3 is provided a spare work zone 31 comprising one or two stations. A human working zone 32 comprising many stations is disposed downstream of the spare work zone 31. In the spare work zone 31, any assemblies or components which are not incorporated or are not correctly incorporated in the incorporation stations for the automated steps due to malfunctioning of the automatic machines are incorporated or corrected. By disposing the spare work zone 31 immediately after the automated assembly line portion 2, when one or more robots in the automated assembly line portion 2 are out of order, the robot or robots can be attended to without completely stopping the assembly line. In the human working zone 32, many workers are deployed and additional components are manually incorporated into the vehicle body. The conveyors 7 forming the manual assembly line 3 are of trolley type shown in FIG. 5 or power-and-free type shown in FIG. 6. As shown in FIG. 5, the trolley type conveyor 7' comprises a hanger 72 hung from a rail 71 to be movable therealong and a driving chain 73 which is movable along the rail 71 and is directly connected to the hanger 72 so that the hanger 72 is continuously fed along with the driving chain 73. As shown in FIG. 6, the power-and-free type conveyor 7" comprises a hanger 75 hung from a rail 74 and a driving chain 76 connected to the hanger 75 by way of a releasable mechanism 77 so that the hanger 75 is continuously fed when the releasable mechanism 77 is in engagement.

In the automated work line portion 4 downstream of the manual assembly line portion 3, automated work stations for performing various automated steps are disposed. The first automated work station in the automated work line portion 4 is a liquid filling station 41 at which various liquids such as brake fluid, washer liquid, antifreeze liquid, oil for power steering mechanism and the like are supplied into respective predetermined portions. The second automated work station is a door mounting station 42 at which the doors removed from the vehicle body at the door removing station 11 are mounted again. The third automated work station is a test station 43 at which measurement and adjustment of wheel and headlight alignment, measurement of braking and side slip, testing of electric systems and the like are conducted. The final automated work station is a water leakage test station 44. The steps to be performed at the stations 41 to 44 have been automated but they must be performed after all the components have been incorporated into the vehicle body. Therefore, the stations 41 to 44 for these steps are disposed in the terminal portion of the main line 1. As the conveyors 8 for forming the automated work line portion 4, a floor train type conveyor similar to the floor train type conveyor 5" shown in FIG. 4 is preferred. Along the automated work line portion 4, the vehicle body is transferred in indexing feed fashion. Between the door removing station 11 and the door mounting station 42 is provided a sub line along which a door sub-assembling station 61 is disposed. At the door sub-assembling station 61, the doors removed from the vehicle body at the door removing station 11 are sub-assembled.

Now the operations performed along the assembly line of this embodiment will be described.

The vehicle body coated at the coating line (not shown) together with the doors is first delivered to the automated assembly line portion 2 and the doors are automatically removed from the vehicle body at the door removing station 11. Then the vehicle body is successively transferred to the incorporation stations 12 to 25 disposed along the automated assembly line portion 2 and the assemblies or components fed to the respective stations by way of the corresponding sub lines 12a to 25a are incorporated into the vehicle body.

The steps to be performed at the respective incorporation stations 12 to 25 includes those which have already been automated (automated steps) and those which are scheduled to be automated (scheduled-to-be-automated steps) and are manually performed for the time being. Therefore, robots and workers mingle in the automated assembly line portion 2. However, since the conveyors 5 forming the automated assembly line portion 2 are train type conveyors which can transfer the vehicle body either in continuous feed fashion or in indexing feed fashion so that the vehicle body is fed in indexing feed fashion at the incorporation stations for the automated steps and is continuously fed at the incorporation stations for the scheduled-to-be-automated steps, all the steps can be properly performed, and, in particular, the STBASs which are manually performed can be performed safely.

The scheduled-to-be-automated steps which are manually performed at present will be gradually automated. In accordance with the line arrangement of the present invention, the STBASs can be automated, without changing the line arrangement, by simply disposing automated machines such as robots in place of workers and by changing the feeding fashion at the station to indexing feed fashion.

Then the vehicle body is delivered to the manual assembly line portion 3 comprising the spare work zone 31 and the human working zone 32. In the spare work zone 31, any assemblies or components which are not incorporated or are not correctly incorporated in the incorporation stations for the automated steps due to malfunctioning of the automatic machines are manually incorporated or corrected. In the human working zone 32, additional components are manually incorporated into the vehicle body. Though many of the additional components are attached to the components incorporated into the vehicle body at the preceding stations, they can be attached in place even if the components to which they are attached are somewhat displaced from the predetermined position since they are manually attached. The conveyors 7 for transferring the vehicle body along the spare work zone 31 and the human working zone 32 are of trolley type or power-and-free type, and continuously feed the vehicle body at a constant speed. Therefore, the operation in the spare work zone 31 and the human working zone 32 can be performed safely.

After passing through the automated assembly line portion 2 and the manual assembly line portion 3, the vehicle body is delivered to the automated work line portion 4. Along the automated work line portion 4, various liquids are supplied as described above, the doors are mounted again and various tests are accomplished as described above at the respective stations 41 to 44, whereby a complete car is off-lined. Along the automated work line portion 4, the vehicle body is transferred by the conveyor 8 (floor train type in this particular embodiment) in indexing feed fashion, thereby facilitating automatic operations.

FIG. 7 shows an assembly line in accordance with another embodiment of the present invention. The line assembly of this embodiment is very similar to that shown in FIG. 2 and comprises an automated assembly line portion 2, a manual assembly line portion 3 and an automated work line portion 4. However, incorporation stations in the automated assembly line portion 2 are arranged so that components incorporated into the vehicle body at the respective incorporation stations do not interfere with each other and a plurality of operations can be continuously performed by one robot. Therefore, description will be made mainly on the arrangement of the incorporation stations in the automated assembly line portion 2.

The incorporation stations or the steps to be performed at the incorporation stations in the automated assembly line portion 2 are grouped into groups A to E according to the vehicle body portions on which the components are mounted at the incorporation stations. At the upstream end of the automated assembly line portion 2 at which the vehicle body is delivered to the automated assembly line portion 2 from the taking-in conveyor 6, is formed a door removing station 11 at which the doors coated together with the vehicle body are removed from the vehicle body by an automated step. The vehicle body removed of the doors is successively transferred to an engine incorporation station 111, a brake line incorporation station 112, an exhaust pipe incorporation station 113, a front axle incorporation station 114, a rear axle incorporation station 115, a tire incorporation station 116, a fuel tank incorporation station 117, an instrument panel incorporation station 118, a seat incorporation station 119, a molded ceiling incorporation station 120, a front grille incorporation station 121, a bumper incorporation station 122, and a windowpane incorporation station 123 in this order. Though not shown, a battery incorporation station and a tail lamp incorporation station are further disposed along the automated assembly line portion 2. The incorporation stations 112 to 123 are fed with assemblies or components to be incorporated into the vehicle body at the respective incorporation stations by way of sublines 112a to 123a. That is, the brake line incorporation station 112 is fed with a brake line assembly from a brake line sub-assembly station 112b, the exhaust pipe incorporation station 113 is fed with an exhaust pipe assembly from an exhaust pipe sub-assembly station 113b, the front axle incorporation station 114 is fed with a front axle assembly including a front suspension and the like from a front axle sub-assembly station 114b, the rear axle incorporation station 115 is fed with a rear axle assembly including a rear suspension from a rear axle sub-assembly station 115b, the tire incorporation station 116 is fed with a tire assembly including a spare tire from a tire sub-assembly station 116b, the fuel tank incorporation station 117 is fed with a fuel tank assembly from a fuel tank sub-assembly station 117b, the instrument panel incorporation station 118 is fed with an instrument panel assembly from an instrument panel subassembly station 118b, the seat incorporation station 119 is fed with a seat assembly from a seat sub-assembly station 119b, the molded ceiling incorporation station 120 is fed with a molded ceiling member from a molded ceiling rack 120b, the front grille incorporation station 121 is fed with a front grille assembly from a front grille sub-assembly station 121b, the bumper incorporation station 122 is fed with a bumper assembly from a bumper sub-assembly station 122b, and the windowpane incorporation station 123 is fed with windowpanes applied with primer and urethane coatings from a primer-/urethane applying station 123b.

In the incorporation stations 111 to 123 or the steps to be performed at the corresponding incorporation stations, the engine incorporation station 111 or the engine incorporation step forms the group A by itself. The incorporation stations 112 to 117 or the steps to be performed at these incorporation stations form the group B and are arranged side by side since the components to be incorporated at the incorporation stations 112 to 117, i.e., the brake line, the exhaust pipe, the front axle, the rear axle, tires and the fuel tank, are all related to the underside of the vehicle body. The order of the steps in the group B is selected so that when the components are attached to the underside of the vehicle body in sequence, the arm of the robot or the component held by the robot arm will not be interfered with by the components incorporated theretofore. That is, the brake line which is to be disposed nearest to the lower surface of the vehicle body floor among the components to be incorporated at the incorporation stations of the group B is first attached to the vehicle body, and then the exhaust pipe is attached. Thereafter, the front axle and the rear axle are mounted below the brake line and the exhaust pipe, and then the tires are mounted on the front and rear axles. Last to be mounted is the fuel tank, which is large in size and would hinder incorporation of the other components if mounted before them.

On the other hand, the instrument panel, the seats and the molded ceiling are interior trims to be incorporated in the passenger compartment. Therefore, the incorporation stations 118 to 120 for incorporating them are arranged side by side as the group C. Similarly to the group B, the order of the steps in the group C is selected so that when the components are attached to the inside of the vehicle body in sequence, the arm of the robot or the component held by the robot arm will not be interfered with by the components incorporated theretofore. That is, in the steps of the group C, the instruments panel is first mounted at the front of the passenger compartment and then the seats are mounted on the floor. This is because the seats hinder mounting of the instrument panel if the seats are mounted before the instrument panel. Finally, the molded ceiling member is attached to the roof of the vehicle body.

The front grille and the bumper are exterior trims to be attached to the outer surface of the vehicle body. Therefore, the incorporation stations 121 and 122 for incorporating them are arranged side by side as the group D. Similarly to the groups B and C, the order of the steps in the group D is selected so that when the components are attached to the outer surface of the vehicle body in sequence, the arm of the robot or the component held by the robot arm will not be interfered with by the components incorporated theretofore. That is, the front grille is mounted before the bumper since otherwise the bumper hinders mounting of the front grille.

The incorporation station 123 forms the group E together with said other stations which are not shown.

Since the windowpanes are incorporated last of all, the steps of the groups A to D cannot be hindered by the windowpanes. Further, since the doors are first removed from the vehicle body, the steps of the groups A to E can be performed without being hindered by the doors.

In the embodiment shown in FIG. 7, steps on the same portion of the vehicle body are performed continuously. Therefore, a plurality of operations can be performed using one robot, thereby reducing the number of robots required for the assembly line. The steps of the groups B to D are on different portions of the vehicle body. Therefore, the incorporation stations of the groups of B to D need not be arranged in this order. For example, they may be arranged in the order of B-D-C.

We claim:

1. A vehicle assembly line along which stations for automated assembly steps using automatic machines such as robots and for manual assembly steps are formed intermixed with each other, comprising an automated assembly line portion, the automated assembly line portion being formed of train type conveyors, said train type conveyors each including at least one work supporting member being movable along a track and where each work supporting member includes a driving mechanism and control means so the conveyor can be moved in either indexing feed fashion or in continuous feed fashion wherein automated stations for automated steps and manual stations for scheduled-to-be-automated steps are included along the automated assembly line portion, the work being fed in indexing feed fashion at said automated stations and the work being fed in continuous feed fashion at the manual stations, the automation of said manual stations scheduled-to-be-automated being facilitated by the capability of said train type conveyors to be changed from feeding the work in said continuous feed fashion to said indexing feed fashion.

2. A vehicle assembly line as defined in claim 1 in which said main line comprises, as the first station, a door removing stsation for automatically removing doors from a vehicle body.

3. A vehicle assembly line as defined in claim 1 in which the stations in the automated assembly line portion are grouped according to the vehicle body portion on which the components are mounted at the stations, the order of the stations in each group being selected so that previously attached components do not interfere with the action of the automated machines, and a door mounting station for automatically mounting the doors on the vehicle body being disposed along the automated work line portion.

4. A vehicle assembly line as defined in claim 3 in which the stations in the automated assembly line portion are grouped into groups including a group of stations for incorporating an engine, a group of stations for incorporating underside components, a group of stations for incorporating interior trims, and a group of stations for incorporating external trims.

5. A vehicle assembly line as defined in claim 4 in which the stations in the group of stations for incorporating the underside components include a brake line incorporation station, an exhaust pipe incorporation station, a front axle incorporation station, a rear axle incorporation station, a tire incorporation station and a fuel tank incorporation station arranged in this order.

6. A vehicle assembly line as defined in claim 4 in which the stations in the group of stations for incorporating the interior trims include an instrument panel incorporation station, a seat incorporation station, and a molded ceiling incorporation station arranged in this order.

7. A vehicle assembly line as defined in claim 4 in which said group of stations for incorporating underside components are provided with overhead train type conveyors, the group of stations for incorporating interior trims are provided with floor train type conveyors, and said manual assembly line portion is provided with overhead type conveyors which may be trolley conveyors or power-and-free type conveyors.

8. A vehicle assembly line as defined in claim 1 in which said manual assembly line portion comprises a spare work zone comprising a few manual work stations disposed at the top of the manual assembly line portion.

9. A vehicle assembly line as defined in claim 1, further comprising a manual assembly line portion disposed downstream from the automated assembly line portion, the manual assembly line portion being formed of continuous feed type conveyors, manual stations for manual assembly step being included along the manual assembly line portion.

10. A vehicle assembly line as defined in claim 9 further comprising an automated work line portion disposed in a terminal portion of the vehicle assembly line, downstream from the manual assembly line portion, said automated work line portion being formed of indexing feed type conveyors and including stations for steps which must be carried out after the manual stations for steps which must be carried out after the manual assembly steps due to limitations on the assembling order being included along the automated work line portion.

11. A vehicle assembly line as defined in claim 10, further comprising a main line comprising the automated assembly line portion, the manual assembly line portion and the automated work line portion.

* * * * *